(12) United States Patent
Loose et al.

(10) Patent No.: US 11,441,703 B2
(45) Date of Patent: Sep. 13, 2022

(54) CONDUIT ALIGNMENT TOOL WITH WINGS (71) Applicant: Faith Technologies, Inc., Menasha, WI (US)

(72) Inventors: Joseph Michael Loose, Menasha, WI (US); Jody David Seubert, Appleton, WI (US); Michael James Quella, Neenah, WI (US)

(*) Notice: Subject to any disclaimer, the term of this patent is extended or adjusted under 35 U.S.C. 154(b) by 0 days.

(21) Appl. No.: 17/161,784

(22) Filed: Jan. 29, 2021

(65) Prior Publication Data
US 2021/0254754 A1 Aug. 19, 2021

Related U.S. Application Data (60) Provisional application No. 62/968,722, filed on Jan. 31, 2020.

(51) Int. Cl.
G01B 5/25 (2006.01)
F16L 1/10 (2006.01)

(52) U.S. Cl.
CPC . F16L 1/10 (2013.01); G01B 5/25 (2013.01)

(58) Field of Classification Search
CPC ..... F16L 1/10; F16L 3/18; F16L 3/223; F16L 21/08; G01B 5/25; H02G 1/00; H02G 3/0462; B23P 19/10; B25B 27/14
See application file for complete search history.

(56) References Cited

U.S. PATENT DOCUMENTS

| | | | |
|---|---|---|---|
| 3,711,127 A | 1/1973 | Raffa | |
| 3,775,986 A | 12/1973 | Daughtry | |
| 3,884,508 A | 5/1975 | Jones | |
| 4,834,825 A | 5/1989 | Adams et al. | |
| 4,993,160 A * | 2/1991 | Fraley | G01C 15/02 33/286 |
| 5,165,160 A * | 11/1992 | Poncelet | B23K 37/0533 228/49.3 |
| 5,236,227 A | 8/1993 | Adams et al. | |
| 5,372,388 A | 12/1994 | Gargiulo | |
| 5,605,419 A | 2/1997 | Reinert, Sr. | |
| 6,945,735 B1 * | 9/2005 | Doverspike | F16L 1/09 249/11 |
| 8,893,396 B2 * | 11/2014 | Gamon | G01C 15/004 33/529 |
| 9,556,711 B2 | 1/2017 | Ward | |

(Continued)

Primary Examiner — Yaritza Guadalupe-McCall
(74) Attorney, Agent, or Firm — Randall W. Fieldhack (57) ABSTRACT An alignment tool for aligning first and second conduit sections at a connection colinearly along a longitudinal axis, wherein the first conduit section has a bell end at the connection and the second conduit section has a narrow end at the connection, includes a collar portion sized to circumscribe the bell end outer diameter; a funnel portion attached to the collar portion, the funnel portion having a diameter that increases in a longitudinal direction away from the collar portion; a step on one of the collar and funnel inner surfaces, the step having a funnel portion side and a collar portion side, wherein an inner diameter of the funnel portion side of the step is equal to the bell end inner diameter; and key and keyway wings extending laterally from the collar portion, wherein the keyway wing includes a keyway and the key wing includes a key.

20 Claims, 7 Drawing Sheets (56) References Cited

U.S. PATENT DOCUMENTS

2014/0115907 A1\* 5/2014 Gamon ................ G01C 15/004
33/286
2021/0254754 A1\* 8/2021 Loose ...................... H02G 1/00
2021/0254770 A1\* 8/2021 Loose ..................... F16L 39/00

\* cited by examiner

CONDUIT ALIGNMENT TOOL WITH WINGS

The present application claims priority to the earlier-filed US Provisional patent application having Ser. No. 62/968,722, and hereby incorporates the subject matter of the provisional application in its entirety.

BACKGROUND

Modern construction often requires runs of power, data, control, and sensor conductors and cabling that are extensive in terms of both distance and the number of conductors or cables to be run. Runs of conductors and cabling can be required to reside within solid conduit that is run both above ground and underground.

During installation, the longitudinal axes of two sections of conduit might not be entirely colinear, leading to difficulty in forming a joint between the two sections. Other attempts might be useful when aligning two or four conduit sections, but they fall short when trying to simultaneously align six, eight, nine, ten, fifteen, twenty, or more conduit sections in an array because a small misalignment on one side of the array can be exacerbated by the time alignment activities reach the other side of the array.

This is further complicated by the fact that the narrow end of a section of conduit is manufactured to fit snugly within the bell end of or the coupling attached to another section of conduit to enable a strong connection. Particularly with PVC conduit, manufacturing tolerances, weather conditions, and material handling can cause one or both of the ends of the conduit sections to be out of round, thereby increasing the difficulty in joining two sections. One can imagine in joining one array of conduit sections to another array of conduit sections that some of the prospective joints can have misaligned longitudinal axes and some can have an end or both ends out of round (particularly with PVC conduit), while others can have any combination of two or more of these.

In the field, arrays of PVC conduit are typically joined one conduit section at a time, with one worker shaping and aligned a conduit end by hand while another worker pounds on an opposite end of the conduit section to force it into position. This method creates a pinch point and an unsafe situation for the worker shaping the conduit end. This method is also inefficient because it requires the arrays to be joined one conduit section at a time, which is especially difficult with respect to the conduit sections in the interior of the array.

Similarly, rack-mounted arrays of EMT conduit are very difficult to align because if one conduit section is minimally misaligned then the entire rack of attached conduit sections will not join. All conduit sections on adjoining arrays must align perfectly or the two arrays will not connect. A special coupling can be used to help with rack mounted arrays of EMT conduit, but the array must still be attached one conduit section at a time requiring multiple actions.

To join arrays of conduit sections in the field and in manufacturing, a more efficient and safer method for guiding and shaping a conduit section is needed, particularly one that allows all of the conduit sections in an array to be joined simultaneously without danger to hands and fingers.

SUMMARY

The present disclosure solves these issues by providing an easy-to-use conduit alignment tool that both aligns the longitudinal axes of conduit sections to be joined and shapes if necessary the ends of conduit sections to be joined into necessary circular shapes. Further, the conduit alignment tool of the present disclosure can be operated by one worker for an improvement in efficiency and safety. The alignment tool of the present disclosure allows an entire array of conduit sections to be connected simultaneously to a second array of conduit sections. Standard couplings can be used with EMT conduit.

In one aspect, the present disclosure provides an alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool including a collar portion sized to circumscribe the bell end outer diameter, the collar portion having a collar inner surface; a funnel portion attached to the collar portion, the funnel portion having a diameter that increases in a longitudinal direction away from the collar portion, wherein the funnel portion has a funnel inner surface; a step on one of the collar and funnel inner surfaces, the step having a funnel portion side and a collar portion side, wherein an inner diameter of the funnel portion side of the step is equal to the bell end inner diameter; and key and keyway wings extending laterally from the collar portion, wherein the keyway wing includes a keyway and the key wing includes a key.

In another aspect, the present disclosure provides an alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool including a collar portion sized to circumscribe the bell end outer diameter, the collar portion having a collar inner surface; a funnel portion attached to the collar portion, the funnel portion having a diameter that increases in a longitudinal direction away from the collar portion, wherein the funnel portion has a funnel inner surface and longitudinal ridges extending radially inward toward the longitudinal axis from the funnel inner surface; a step on one of the collar and funnel inner surfaces, the step having a funnel portion side and a collar portion side, wherein an inner diameter of the funnel portion side of the step is equal to the bell end inner diameter; and key and keyway wings extending laterally from the collar portion, wherein the keyway wing includes a keyway and the key wing includes a key.

An alternate aspect of the present disclosure provides an alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool including a collar portion sized to circumscribe the bell end outer diameter, the collar portion having a collar inner surface and longitudinal ridges extending radially inward toward the longitudinal axis from the collar inner surface; a funnel portion attached to the collar portion, the funnel portion having a diameter that increases in a longitudinal direction away from the collar portion, wherein the funnel portion has a funnel inner surface and longitudinal ridges extending radially inward toward the longitudinal axis from the funnel inner surface; and key and keyway wings extending laterally from the collar portion, wherein the keyway wing includes a keyway and the key wing includes a key.

Another alternate aspect of the present disclosure provides an alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool including a collar portion sized to circumscribe the bell end outer diameter, the collar portion having a collar inner surface and longitudinal ridges extending radially inward toward the longitudinal axis from the collar inner surface; a funnel portion attached to the collar portion, the funnel portion having a diameter that increases in a longitudinal direction away from the collar portion; a step on one of the collar and funnel inner surfaces, the step having a funnel portion side and a collar portion side, wherein an inner diameter of the funnel portion side of the step is equal to the bell end inner diameter; and key and keyway wings extending laterally from the collar portion, wherein the keyway wing includes a keyway and the key wing includes a key.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents.

Generally speaking, the present disclosure is directed to a conduit alignment tool. As used herein, "conduit" refers to any relevant plastic, polyvinyl chloride (PVC), or metallic conduit, pipe, or tubing, particularly those of limited flexibility. As used herein, conduit includes tubular conveyances for electrical wiring, fiber optics, other cabling and conductors, fluids, and other substances. A section of conduit is generally tubular with two ends, an outer surface, an inner surface, an outside diameter, and an inside diameter. In some aspects of the present disclosure, the conduit section can include a bell or female end into which the narrow or male end of another conduit section can be fitted (see FIGS. 1 and 3). In other aspects, the conduit will have two narrow or male ends and can be joined with a connector having two wider or female ends (see FIGS. 4-7).

In various aspects, the conduit can be a section of standard PVC conduit or a section of standard electrical metallic tubing (EMT) conduit. In the latter example, two sections of EMT conduit can be joined by a standard EMT connector.

Figure 1:
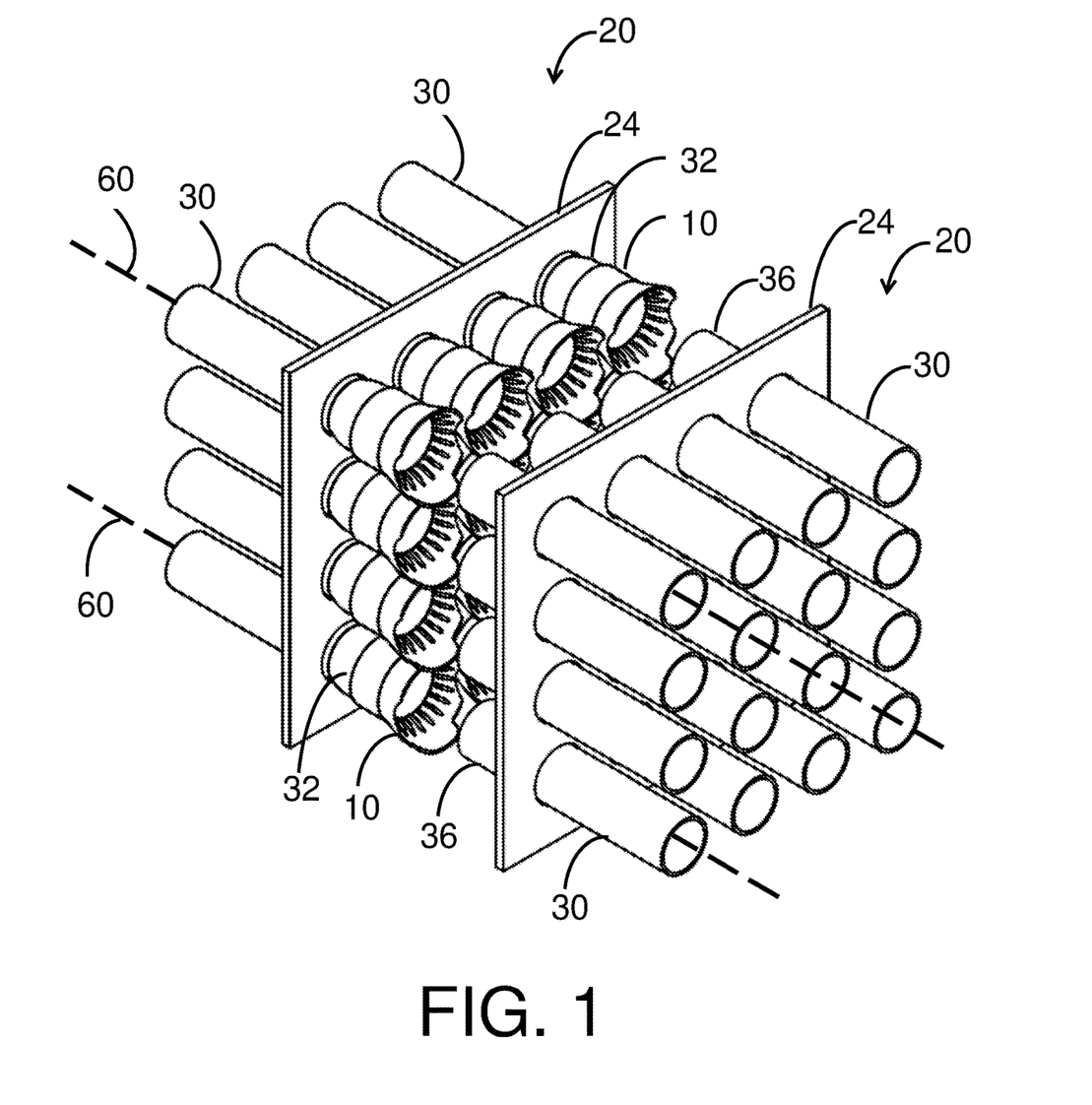
FIG. 1 representatively illustrates a perspective view of adjacent arrays of conduit sections prior to being joined.

FIG. 1 illustrates one of the contexts in which the conduit alignment tool 10 of the present disclosure can be employed. A conduit array 20 is formed from a number of conduit sections 30. Each conduit section 30 in the example illustrated in FIG. 1 includes a bell or female end 32 and a narrow or male end 36. The bell end 32 is typically integral with the conduit section 30. In other aspects, the bell end 32 can be a connector or other structure added to a conduit section 30. In still other aspects, a conduit section 30 can include two narrow ends 36. The conduit array 20 is generally defined by the number of conduit sections 30 that can be accommodated by each spacer 24. Each spacer 24 and therefore the conduit array 20 can include two or more conduit sections 30. In the example illustrated in FIG. 1, the spacers 24 define a conduit array 20 of four rows and three columns of conduit sections 30 for a total of twelve conduit sections 30. In other aspects, the conduit array 20 can have any number of conduit sections 30 in patterns defined by spacers 24. The conduit array 20 can also be a line of conduit sections 30 or a single conduit section 30.

Each spacer 24 can include one or more pieces that are assembled and installed to define the conduit array 20. Each spacer 24 can be anchored to the ground, floor, walls, or other available anchor points. The conduit array 20 can be positioned in a trench or other structure during or after its assembly. In some cases, the conduit array 20 is encased in concrete following installation.

Figure 5:
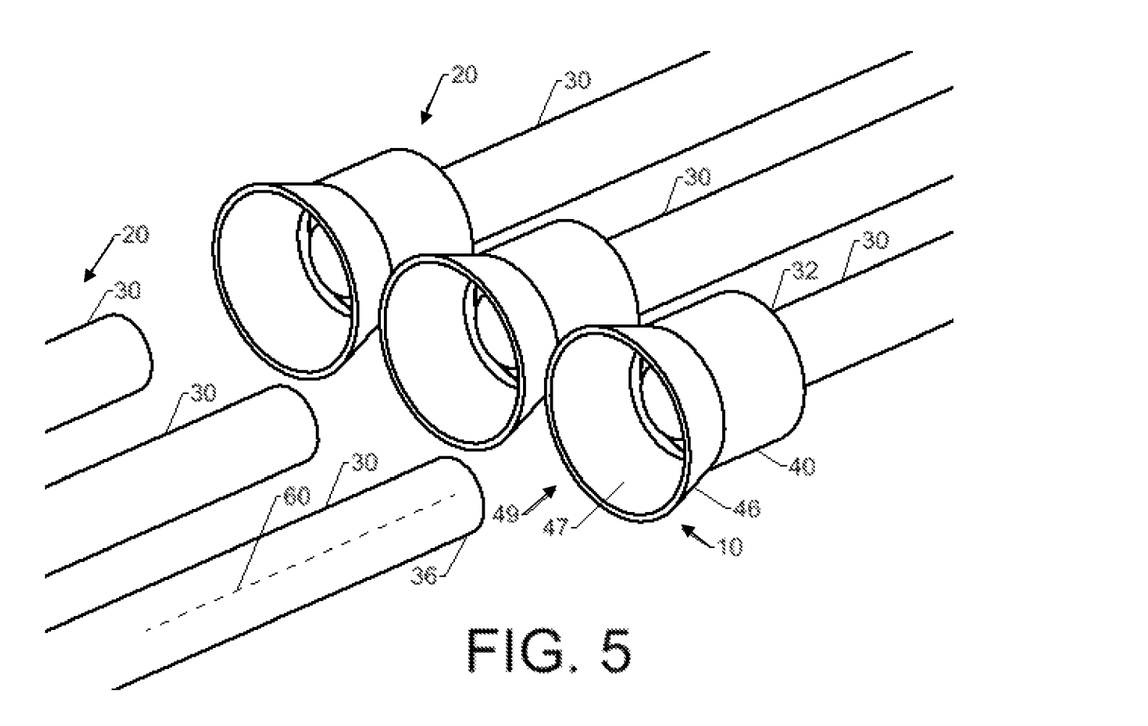
FIG. 5 representatively and photographically illustrates a perspective view of adjacent arrays of EMT conduit sections prior to being joined.

FIG. 5 illustrates another context in which the conduit alignment tool 10 of the present disclosure can be employed. A conduit array 20 is formed from a number of conduit sections 30. Each conduit section 30 in the example illustrated in FIG. 5 includes a bell end 32 and a narrow end 36, where the bell end 32 is a connector or other structure added to a conduit section 30. In still other aspects, a conduit section 30 can include two narrow ends 36. The conduit array 20 is generally defined by the number of conduit sections 30 that can be accommodated by each rack with strut straps 124. Each rack with strut straps 124 and therefore the conduit array 20 can include two or more conduit sections 30. In the example illustrated in FIG. 5, the rack with strut straps 124 define a conduit array 20 of one rows of eight conduit sections 30. In other aspects, the conduit array 20 can have any number of conduit sections 30 in patterns defined by rack with strut straps 124. The conduit array 20 can also be a single conduit section 30.

As described above, a major source of difficulty is connecting one conduit array 20 to an adjoining conduit array 20 in an efficient manner due to the likelihood of misalignment of one or more conduit sections 30 in a conduit array 20 of conduit sections 30, making the simultaneous connection of multiple conduit sections 30 quite difficult and unsafe when alignment and connection are made individually and manually. The possibility of one or more conduit sections 30 also being out of round aggravates the difficulty of making connections.

A conduit alignment tool 10 of the present disclosure assists a worker in both aligning and rounding each conduit section 30 such that each conduit section 30 in a conduit array 20 can be connected simultaneously with a matching conduit section 30 in an adjoining array. FIGS. 2-7 illustrate the conduit alignment tool 10 of the present disclosure.

The conduit alignment tool 10 is used to align first and second conduit sections 30 at a connection colinearly along a longitudinal axis 60. The first conduit section 30 has a bell end 32 at the connection and the second conduit section 30 has a narrow end 36 at the connection. The bell end 32 has a bell end inner diameter 38 and a bell end outer diameter 34.

The conduit alignment tool 10 includes a collar portion 40 sized to circumscribe the bell end outer diameter 34. The collar portion 40 has a collar inner surface 42 and optional longitudinal ridges 44 extending radially inward toward the longitudinal axis 60 from the collar inner surface 42.

The conduit alignment tool 10 also includes a funnel portion 46 attached to the collar portion 40, the funnel portion 46 having a diameter that increases in a longitudinal direction away from the collar portion 40. In other words, the diameter of the funnel portion 46 increases with distance from the collar portion 40. The funnel portion 46 has a funnel inner surface 47 and optional longitudinal ridges 48 extending radially inward toward the longitudinal axis 60 from the funnel inner surface 47. The funnel portion 46 includes a funnel mouth 49, which is the opening of the funnel portion 46 away from the collar portion 40.

In various embodiments, the collar portion 40 and the funnel portion 46 can be formed integrally or can be formed separately and affixed or otherwise attached together.

The conduit alignment tool 10 can also include a step 50 on one of the collar and funnel inner surfaces 42, 47. The step 50 has a funnel portion side 52 and a collar portion side 54, wherein an inner diameter of the funnel portion side 52 of the step 50 is equal to the bell end inner diameter 38. The step 50 is designed to match the funnel portion side 52 to the bell end inner diameter 38 such that a conduit section 30 when slid into the funnel portion 46 will not meet an obstruction from the bell end 32 of a conduit section 30. The step 50 is also designed to provide a stop to limit the distance with which the conduit alignment tool 10 can be slid onto the bell end 32 of the conduit section 30. An inner diameter of the collar portion side 54 of the step 50 is generally equal to the diameter of the collar inner surface 42 and generally equal to the bell end outer diameter 34.

In other aspects of the present disclosure, the longitudinal ridges 48 of the funnel portion 46 can be sized to perform the functions of the step 50, thus eliminating the need for a step. The height of the longitudinal ridges 48 can be selected to match the bell end inner diameter 38 such that a conduit section 30 when slid into the funnel portion 46 will not meet an obstruction from the bell end 32 of a conduit section 30.

Figure 2:
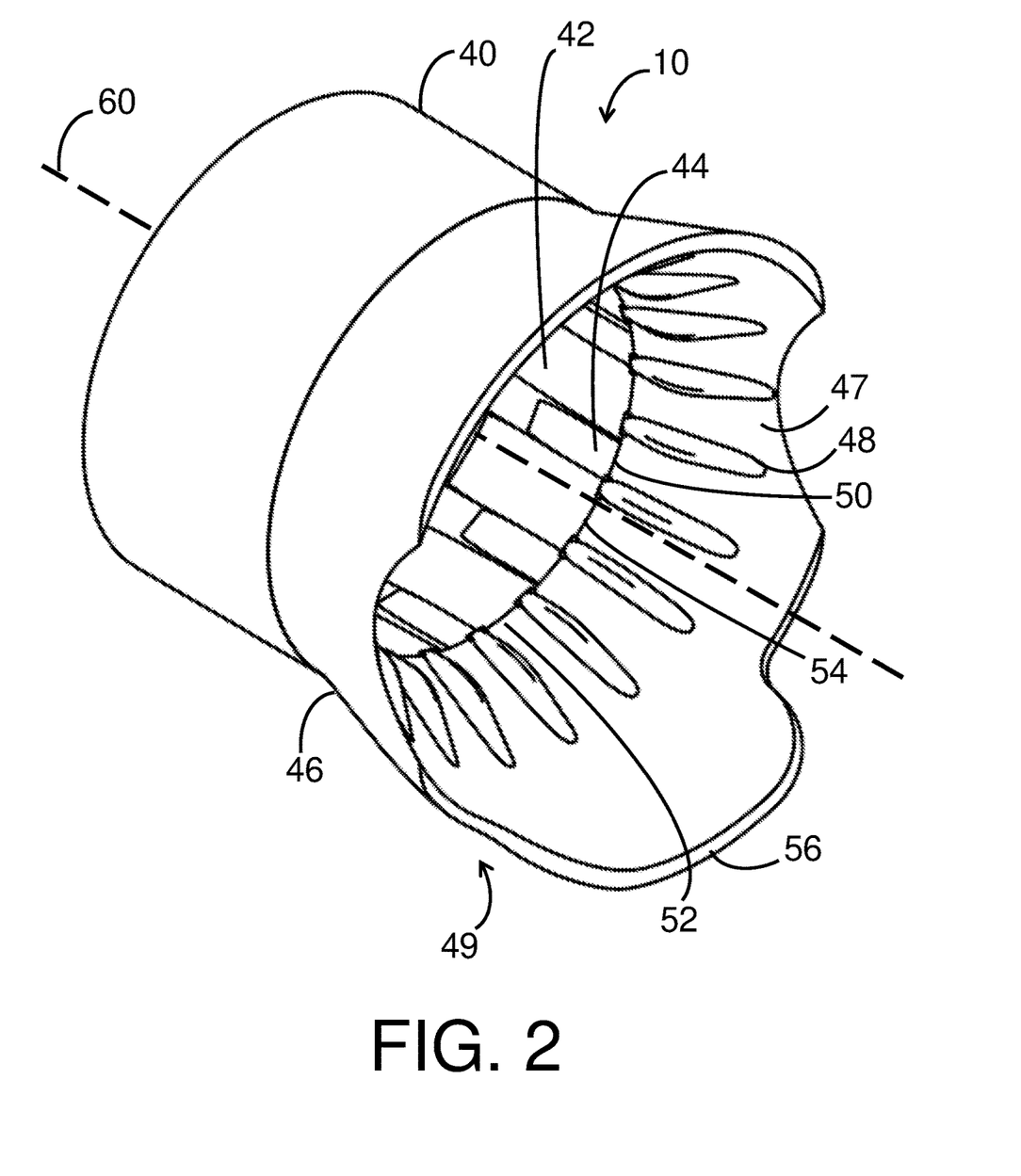
FIG. 2 representatively illustrates a perspective view of the conduit alignment tool of the present disclosure.
Figure 3:
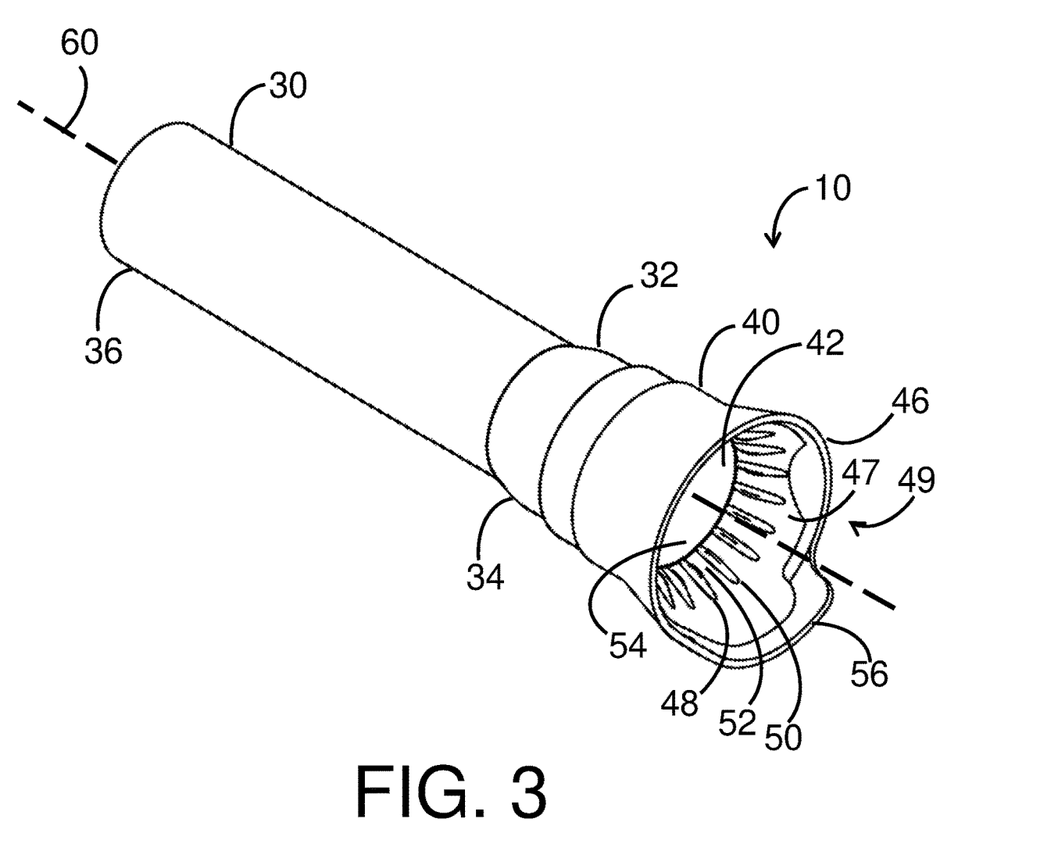
FIG. 3 representatively illustrates a perspective view of the conduit alignment tool of FIG. 2 disposed on the bell end of a section of conduit.
Figure 4:
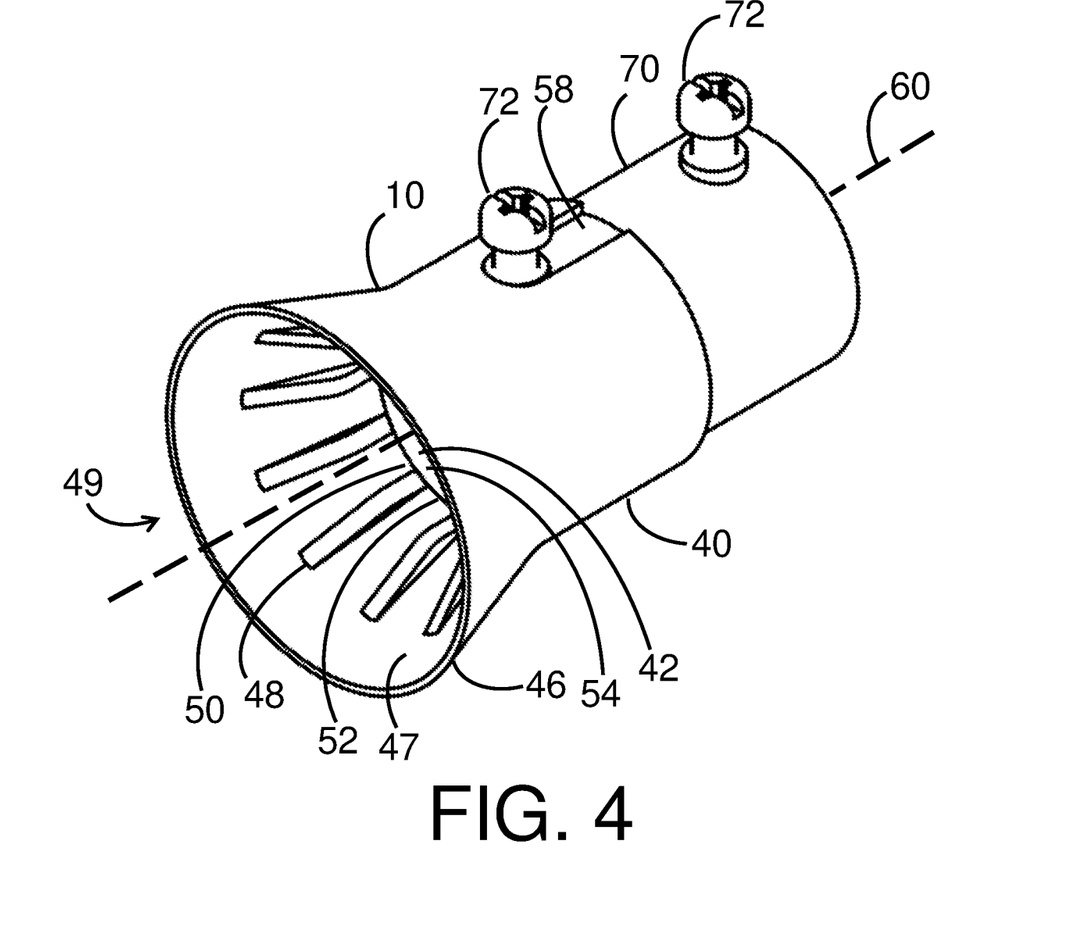
FIG. 4 representatively illustrates a perspective view of the conduit alignment tool of FIG. 2 disposed on a connector for use with metal conduit section.

The funnel portion 46 of the conduit alignment tool 10 has a length taken from the line at which the funnel portion 46 meets the collar portion 40 to the funnel mouth 49. In various aspects, the length of the funnel portion can be azimuthally uniform such as that shown in FIGS. 4-7 or the length can be greater at some azimuths than it is at other azimuths, such as that shown in FIGS. 2 and 3. The non-uniformity in the length of the funnel portion 46 can be created by the optional inclusion of a guide or guides 56 extending from the funnel mouth 49 in a direction away from the collar portion 40, as shown in FIGS. 2 and 3. The guide or guides 56 provide control to an incoming conduit section 30 without the material cost and weight of extending the entire funnel portion 46.

For the aspects in which the conduit sections 30 are EMT, the conduit sections 30 do not generally include a bell end 32. The two narrow ends 36 of adjoining conduit section can be connected by an EMT connector 70 having two bell ends 32. As a result, an EMT conduit section 30 with an EMT connector 70 attached to one end becomes a conduit section 30 with a narrow end 36 and a bell end 32 as described above. The conduit alignment tool 10 can then be used as described above and as shown in FIGS. 4-7. EMT connectors 70 can include one or more set screws 72 to assist with the connection to an EMT conduit section 30. The conduit alignment tool 10 used in such a circumstance can includes a notch or cutout 58 to accommodate a set screw 72. Use of the conduit alignment tool 10 in conjunction with EMT connectors 70 eliminates the need to use costlier slip fit connectors. In addition, the conduit alignment tool 10 increases efficiency by eliminating the many steps required in the use of slip fit connectors.

The conduit alignment tool 10 of the present disclosure can be manufactured from various polymers, metal, or any other suitable material that is strong but not brittle. The conduit alignment tool 10 can be produced by injection-molding, 3D printing, stamping, or any other suitable production method. The conduit alignment tool 10 generally finds the most value in use with non-threaded conduit, specifically EMT- and PVC-type conduit, but can be used with threaded conduit as well.

Figure 6:
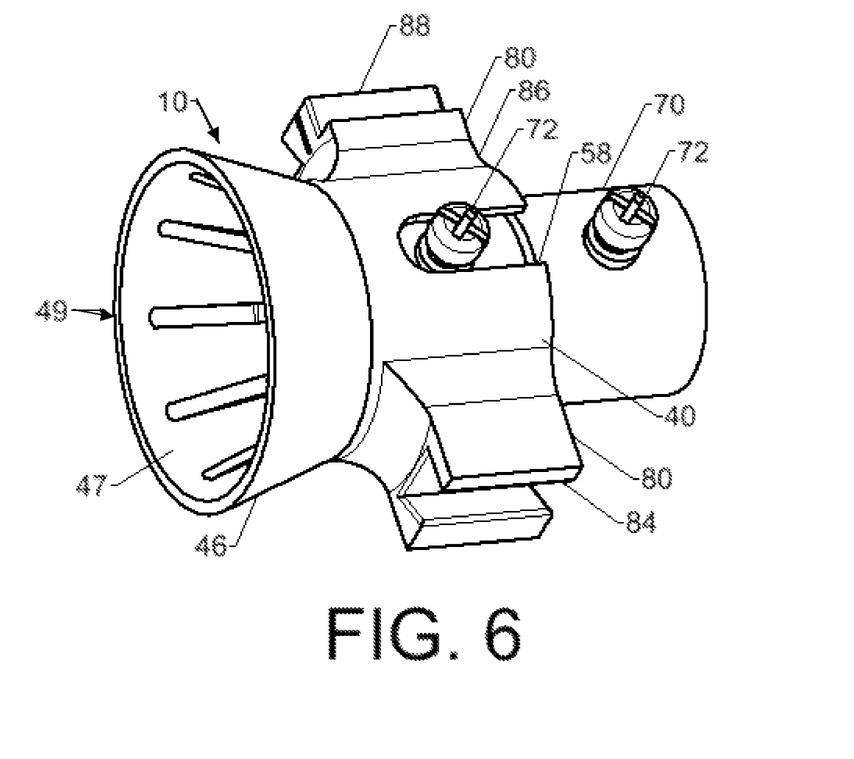
FIG. 6 representatively and photographically illustrates a perspective view of another aspect of the conduit alignment tool of FIG. 4.
Figure 7:
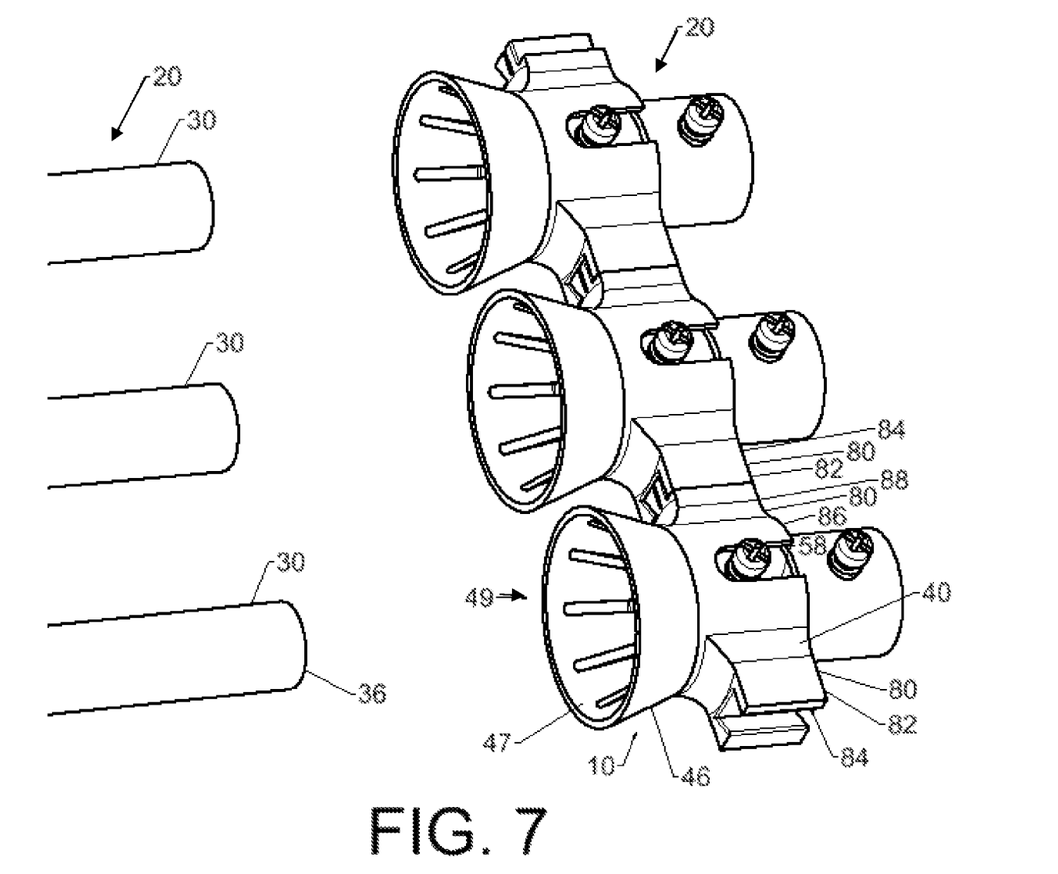
FIG. 7 representatively and photographically illustrates a perspective view of adjacent 1×3 arrays of EMT conduit sections using the conduit alignment tool of FIG. 6 prior to being joined.

In another aspect of the present disclosure illustrated in FIGS. 6 and 7, the conduit alignment tool 10 can include wings 80 to allow laterally-adjacent conduit alignment tools 10 to be connected. A keyway wing 82 of the conduit alignment tool 10 includes a keyway 84 while the opposite key wing 86 of the conduit alignment tool 10 includes a key 88. As best seen in FIG. 7, the key 88 of one conduit alignment tool 10 fits into the keyway 84 of an adjacent conduit alignment tool 10 such that spacing between adjacent conduit sections 30 is uniform and set at the desired distance. One or both of the key 88 and keyway 84 can be configured to be flexible enough to allow a key 88 to snap out of a keyway 84 should the connection be stressed. Any number of conduit sections 30 and therefore conduit alignment tools 10 can be laterally locked to one another to facilitate spacing of conduit sections 30 within a conduit array 20 and thereby alignment of the conduit array 20 with an adjacent conduit array 20.

In use in conjunction with adjoining conduit section 30, the conduit alignment tool 10 is positioned on the bell end 32 of a conduit section 30 and pushed onto the bell end 32 until the step 50 or longitudinal ridges 48 meet the end of the bell end 32. The circular shape of the conduit alignment tool 10 forces the bell end 32 of the conduit section 30 into the desired circular shape. The narrow end 36 of an adjoining conduit section 30 is then slid into the conduit alignment tool 10. The funnel portion 46 guides the narrow end 36 into proper alignment with the bell end 32. The funnel portion 46 also shapes if necessary the narrow end 36 into the desired circular shape to fit easily into the bell end 32.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. An alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool comprising:
   a collar portion sized to circumscribe the bell end outer diameter, the collar portion having a collar inner surface;
   a funnel portion attached to the collar portion, the funnel portion having a diameter that increases in a longitudinal direction away from the collar portion, wherein the funnel portion has a funnel inner surface;
   a step on one of the collar and funnel inner surfaces, the step having a funnel portion side and a collar portion side, wherein an inner diameter of the funnel portion side of the step is equal to the bell end inner diameter; and
   key and keyway wings extending laterally from the collar portion, wherein the keyway wing includes a keyway and the key wing includes a key.

2. The alignment tool of claim 1, wherein the key is configured to fit within the keyway.

3. The alignment tool of claim 1, wherein an inner diameter of the collar portion side of the step is equal to the bell end outer diameter.

4. The alignment tool of claim 1, wherein the funnel portion has a longitudinal length, and wherein the length of a first area of the funnel portion is different from the length of a second area of the funnel portion.

5. The alignment tool of claim 1, wherein the funnel portion has a plurality of longitudinal lengths, and wherein the longitudinal lengths are not uniform.

6. The alignment tool of claim 1, wherein the funnel portion has guides extending in a direction away from the collar portion.

7. The alignment tool of claim 1, wherein the bell end is an EMT connector.

8. The alignment tool of claim 7, wherein the EMT connector includes a set screw, and wherein the collar portion includes a cutout to accommodate the set screw.

9. The alignment tool of claim 1, wherein the first conduit section is a conduit fitting and the second conduit section is a conduit section.

10. The alignment tool of claim 1, wherein the collar portion is affixed to the funnel portion.

11. The alignment tool of claim 1, wherein the collar portion is formed integrally with the funnel portion.

12. The alignment tool of claim 1, further comprising longitudinal ridges extending radially inward toward the longitudinal axis from the collar inner surface.

13. The alignment tool of claim 1, further comprising longitudinal ridges extending radially inward toward the longitudinal axis from the funnel inner surface.

14. An alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool comprising:
   a collar portion sized to circumscribe the bell end outer diameter, the collar portion having a collar inner surface;
   a funnel portion attached to the collar portion, the funnel portion having a diameter that increases in a longitudinal direction away from the collar portion, wherein the funnel portion has a funnel inner surface and longitudinal ridges extending radially inward toward the longitudinal axis from the funnel inner surface;
   a step on one of the collar and funnel inner surfaces, the step having a funnel portion side and a collar portion side, wherein an inner diameter of the funnel portion side of the step is equal to the bell end inner diameter; and
   key and keyway wings extending laterally from the collar portion, wherein the keyway wing includes a keyway and the key wing includes a key.

15. The alignment tool of claim 14, wherein the key is configured to fit within the keyway.

16. An alignment tool for aligning first and second conduit sections at a connection colinearly along a longitudinal axis, wherein the first conduit section has a bell end at the connection and the second conduit section has a narrow end at the connection, and wherein the bell end has a bell end inner diameter and a bell end outer diameter, the tool comprising:
   a collar portion sized to circumscribe the bell end outer diameter, the collar portion having a collar inner surface and longitudinal ridges extending radially inward toward the longitudinal axis from the collar inner surface;
   a funnel portion attached to the collar portion, the funnel portion having a diameter that increases in a longitudinal direction away from the collar portion;
   a step on one of the collar and funnel inner surfaces, the step having a funnel portion side and a collar portion side, wherein an inner diameter of the funnel portion side of the step is equal to the bell end inner diameter; and
   key and keyway wings extending laterally from the collar portion, wherein the keyway wing includes a keyway and the key wing includes a key.

17. The alignment tool of claim 16, wherein the key is configured to fit within the keyway.

18. The alignment tool of claim 16, wherein an inner diameter of the collar portion side of the step is equal to the bell end outer diameter.

19. The alignment tool of claim 16, wherein the bell end is an EMT connector.

20. The alignment tool of claim 19, wherein the EMT connector includes a set screw, and wherein the collar portion includes a cutout to accommodate the set screw.

* * * * *